United States Patent
Yamaguchi et al.

(10) Patent No.: US 8,620,127 B2
(45) Date of Patent: Dec. 31, 2013

(54) OPTICAL WAVEGUIDE AND METHOD FOR MANUFACTURING THE SAME

(75) Inventors: Masatoshi Yamaguchi, Ibaraki (JP); Tomoaki Shibata, Ibaraki (JP); Takeshi Oohashi, Ibaraki (JP); Atsushi Takahashi, Ibaraki (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 424 days.

(21) Appl. No.: 12/808,537

(22) PCT Filed: Dec. 11, 2008

(86) PCT No.: PCT/JP2008/072562
§ 371 (c)(1),
(2), (4) Date: Apr. 11, 2011

(87) PCT Pub. No.: WO2009/078341
PCT Pub. Date: Jun. 25, 2009

(65) Prior Publication Data
US 2011/0188827 A1    Aug. 4, 2011

(30) Foreign Application Priority Data
Dec. 17, 2007    (JP) .................................. 2007-325224

(51) Int. Cl.
*G02B 6/10* (2006.01)
(52) U.S. Cl.
USPC ....................................................... 385/129
(58) Field of Classification Search
USPC ....................................................... 385/129
See application file for complete search history.

(56) References Cited

U.S. PATENT DOCUMENTS 5,625,730 A * 4/1997 Ishikawa et al. ................. 385/49
5,699,461 A * 12/1997 Minemoto et al. ............... 385/12
(Continued)

FOREIGN PATENT DOCUMENTS

CN    101035855    9/2007
EP    2 159 262    3/2010
(Continued)

OTHER PUBLICATIONS

Chinese Official Action issued on Feb. 13, 2012 in connection with Chinese Application No. 200880121017.5; 5 pages; Chinese Patent Office, China.

*Primary Examiner* — Charlie Peng
(74) *Attorney, Agent, or Firm* — Antonelli, Terry, Stout & Kraus, LLP.

(57) ABSTRACT

The invention provides an optical waveguide including a resin substrate containing an inorganic filler, and at least a UV-absorbing layer, a lower cladding layer, a patterned core layer, and an upper cladding layer laminated above the resin substrate in this order, wherein the core layer has been patterned through light exposure and development, and the UV-absorbing layer has a thickness of 10 to 50 μm, and a method for producing an optical waveguide, including a step of forming a UV-absorbing layer on a resin substrate containing an inorganic filler; a step of forming a lower cladding layer on the UV-absorbing layer; a step of forming a core layer on the lower cladding layer; a step of subjecting the core layer to light exposure to thereby transfer a pattern having a given shape to the core layer; a step of developing the core layer to thereby form a core pattern; and a step of forming an upper cladding layer on the patterned core layer. According to the present invention, an optical waveguide having a high-resolution core pattern can be produced.

12 Claims, 4 Drawing Sheets

(56) References Cited

U.S. PATENT DOCUMENTS

| | | |
|---|---|---|
| 6,475,700 B1 * | 11/2002 | Higashi et al. ............. 430/278.1 |
| 6,529,668 B1 * | 3/2003 | Canning ...................... 385/131 |
| 6,833,176 B2 * | 12/2004 | Chisholm et al. ............. 428/156 |
| 7,846,984 B2 * | 12/2010 | Doi et al. ...................... 521/40 |
| 2002/0136526 A1 * | 9/2002 | Pottebaum et al. ........... 385/143 |
| 2003/0133680 A1 * | 7/2003 | Yokoyama et al. ........... 385/129 |
| 2005/0165151 A1 * | 7/2005 | Fujiwara et al. .............. 524/449 |
| 2005/0238278 A1 * | 10/2005 | Nakashiba et al. ............. 385/14 |
| 2007/0185300 A1 | 8/2007 | Kojima et al. |
| 2010/0009149 A1 * | 1/2010 | Oka et al. ..................... 428/220 |

FOREIGN PATENT DOCUMENTS

| | | |
|---|---|---|
| JP | 62-72195 | 4/1987 |
| JP | 07-278516 | 10/1995 |
| JP | 10288714 A * | 10/1998 |
| JP | 11038252 A * | 2/1999 |
| JP | 2004-020767 | 1/2004 |
| JP | 2006-058831 | 3/2006 |
| JP | 2007233318 | 9/2007 |
| WO | WO2005/081025 | 9/2005 |
| WO | WO2007/063813 | 6/2007 |
| WO | WO2007/125740 | 11/2007 |

* cited by examiner

OPTICAL WAVEGUIDE AND METHOD FOR MANUFACTURING THE SAME

TECHNICAL FIELD

The present invention relates to an optical waveguide having a high-resolution core pattern and to a method for producing the optical waveguide.

BACKGROUND ART

With the increase in information capacity associated with the growth of the Internet and LANs (Local Area Networks), development of optical interconnection techniques employing optical signal have proceeded in various applications including not only telecommunication applications such as trunk lines and access systems but also short-distance signal transmission between or within boards in routers or servers. In such applications, an optical waveguide is preferably employed as an optical transmission line, since the optical waveguide attains higher wiring flexibility and higher wiring density, as compared with optical fiber. Among the materials of optical waveguides, a low-cost polymer material having high processability is a promising candidate. Specifically, since a polymer optical waveguide is employed for optical signal transmission between or within boards in routers and servers, an optical-electrical composite board on which the polymer optical waveguide is mounted in combination with an electric wiring board has been developed. As a method for producing the optical-electrical composite board, a light-exposure/development technique, which is generally employed in production of resist for printed wiring boards, is advantageous from the viewpoints of productivity and cost (see, for example, Patent Document 1).

Currently, optical waveguides employed in optical-electrical composite boards are required to meet wiring density demand of 250 μm-pitch (line & space of 50 μm:200 μm) in consideration of connection with a commercial optical element array; specifically, a VCSEL (Vertical Cavity Surface Emitting Laser) array, a PD (Photo Diode) array, or a multi-core ribbon optical fiber.

However, wiring density is thought to increase more and more in the future, and the aforementioned 250 μm pitch will be narrower. In order to keep pace with the trend, demand will arise for optical wiring of higher resolution.
[Patent Document 1] JP 2004-20767A

DISCLOSURE OF THE INVENTION

Problems to be Solved by the Invention

Printed wiring boards for use as optical-electrical composite boards preferably contain an inorganic filler for attaining high elastic modulus and high heat resistance.

However, studies by the present inventors have revealed that when a substrate containing an inorganic filler is employed, exposure light is scattered and reflected by the inorganic filler, thereby impairing the resolution of the produced optical waveguide. This phenomenon is a problem to be solved in provision of high-density optical wiring.

FIG. 1 schematically shows production of a conventional optical waveguide. In an optical waveguide 1, a lower cladding layer 4 is laminated on a substrate 3 containing an inorganic filler 2, and a core layer 5 is laminated on the lower cladding layer 4. The core layer 5 having a core pattern 6 of interest is formed through irradiation with a UV ray 8 via a photomask 7. During light exposure, the UV ray 8 is partially reflected by the inorganic filler 2 contained in the substrate, whereby portions which should not be irradiated are irradiated. Since the wiring density hitherto required has been about 50 μm/200 μm for line width/line space, such UV ray reflection has not been critical. However, in the case where an optical waveguide having a narrow wiring pitch of, for example, 50 μm/50 μm for line width/line space, such UV ray reflection is considerably problematic, thereby failing to attain sufficient resolution.

In order to solve the aforementioned problem, an object of the present invention is to provide an optical waveguide having a high-resolution core pattern. Another object is to provide a method for producing the optical waveguide.

Means for Solving the Problems

The present inventors have carried extensive studies in order to solve the aforementioned problem, and have found that the problem can be solved by forming on a substrate a UV-absorbing layer having a specific thickness. The present invention has been accomplished on the basis of this finding.

Accordingly, the present invention provides the following:
(1) An optical waveguide comprising:
   a resin substrate containing an inorganic filler; and
   at least a UV-absorbing layer, a lower cladding layer, a patterned core layer, and an upper cladding layer laminated above the substrate in this order,
   wherein
   the core layer has been patterned through light exposure and development, and
   the UV-absorbing layer has a thickness of 10 to 50 μm;
(2) The optical waveguide as described in (1) above, wherein the UV-absorbing layer is formed from a photosensitive resin composition, which comprises:
   (A) a thermoplastic polymer having a carboxyl group,
   (B) a photopolymerizable compound having a polymerizable ethylenically unsaturated group in the molecule thereof, and
   (C) a photopolymerization initiator;
(3) The optical waveguide as described in (2) above, wherein the (B) photopolymerizable compound includes a urethane compound having an ethylenically unsaturated group;
(4) The optical waveguide as described in (3) above, wherein
   the urethane compound having an ethylenically unsaturated group is produced through reaction between a urethane compound having an isocyanate group at each end and a hydroxyl-group-having ethylenically unsaturated compound, and
   the urethane compound having an isocyanate group at each end is produced through reaction between a polycarbonate compound having a hydroxyl group at each end and a diisocyanate compound;
(5) The optical waveguide as described in any one of (1) to (4) above, wherein
   the UV-absorbing layer has a UV transmittance of 50% or less at a wavelength of the light exposure;
(6) The optical waveguide as described in any one of (1) to (5) above, wherein
   a content of the inorganic filler is of 15 to 75 vol. %;
(7) The optical waveguide as described in any one of (1) to (6) above, wherein
   the inorganic filler is silica;
(8) A method for producing an optical waveguide, comprising:
   a step of forming a UV-absorbing layer on a resin substrate containing an inorganic filler;

a step of forming a lower cladding layer on the UV-absorbing layer;

a step of forming a core layer on the lower cladding layer;

a step of subjecting the core layer to light exposure to thereby transfer a pattern having a given shape to the core layer;

a step of developing the core layer to thereby form a core pattern; and a step of forming an upper cladding layer on the patterned core layer;

(9) The method for producing an optical waveguide as described in (8) above, wherein the step of forming the UV-absorbing layer comprises laminating a UV-absorbing film on the substrate and pressing the film to the substrate under heating; and

(10) The method for producing an optical waveguide as described in (8) or (9) above, wherein a lower cladding layer-forming film, a core layer-forming film, and an upper cladding layer-forming film are employed respectively in the steps of forming a lower cladding layer, a core layer, and an upper cladding layer.

Effects of the Invention

Since the optical waveguide of the present invention has a high-resolution core pattern, high-density optical wiring can be realized. According to the production method of the present invention, an optical waveguide having a high-resolution core pattern can be produced at high productivity.

DESCRIPTION OF THE REFERENCE NUMERALS

| | |
|---|---|
| 1: | Optical waveguide |
| 2: | Inorganic filler |
| 3: | Substrate |
| 4: | Lower cladding layer |
| 4': | Lower cladding layer-forming resin layer |
| 5: | Core layer |
| 5': | Core layer-forming resin layer |
| 6: | Core pattern |
| 7: | Photomask |
| 8: | UV ray |
| 9: | Upper cladding layer |
| 9': | Upper cladding layer-forming resin layer |
| 10, 10': | UV-absorbing layer |
| 11: | UV-absorbing film |
| 12: | Base film |
| 13: | Protective film |
| 41: | Lower cladding layer-forming resin film |
| 42: | Base film |
| 43: | Protective film |
| 51: | Core layer-forming resin film |
| 52: | Base film |
| 53: | Protective film |
| 91: | Upper cladding layer-forming resin film |
| 92: | Base film |
| 93: | Protective film |

BEST MODE FOR CARRYING OUT THE INVENTION

Figure 1:
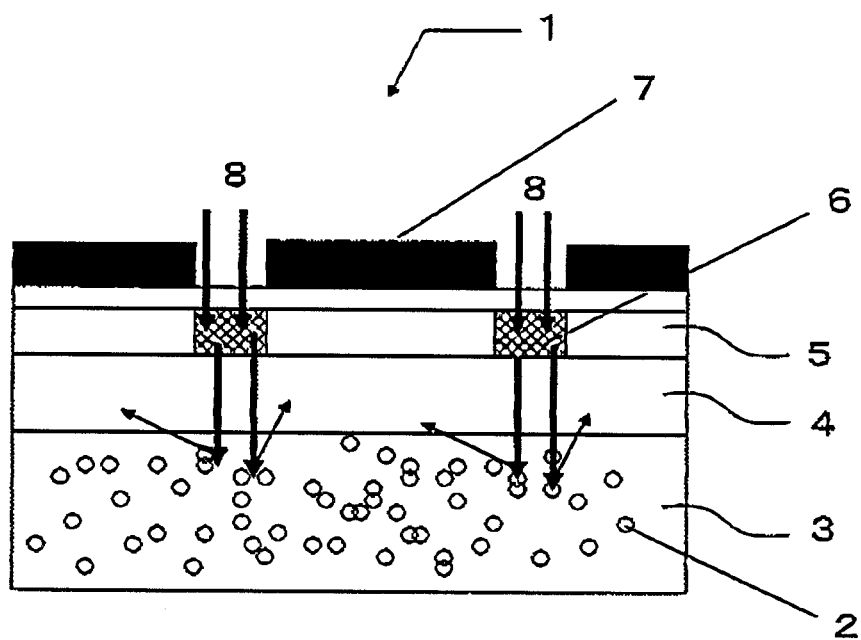
FIG. 1 A sketch conceptually showing a conventional light exposure technique.
Figure 2:
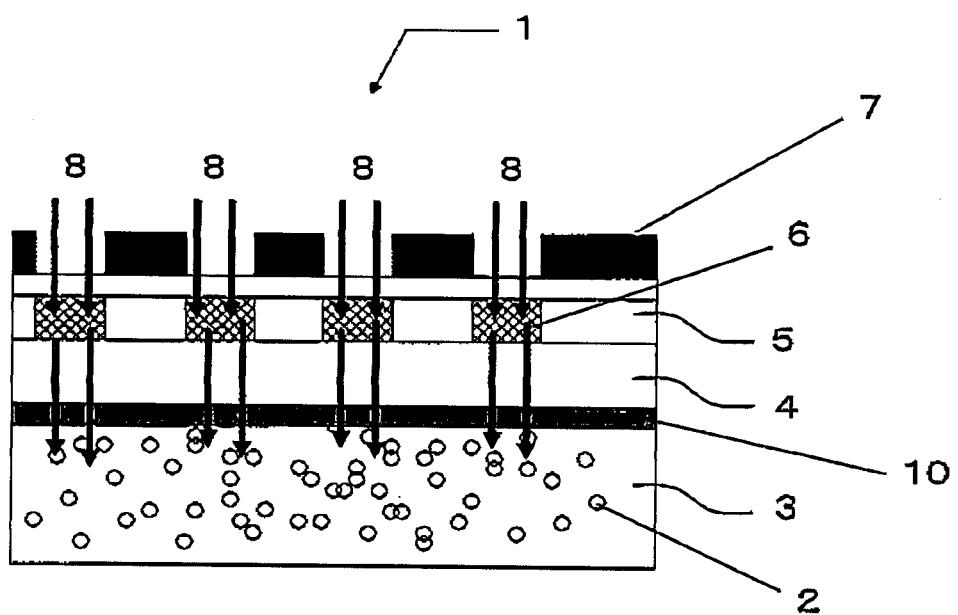
FIG. 2 A sketch conceptually showing a light exposure technique of the present invention.

The optical waveguide of the present invention includes a resin substrate containing an inorganic filler, and at least a UV-absorbing layer, a lower cladding layer, a patterned core layer, and an upper cladding layer laminated above the substrate in this order. The UV-absorbing layer effectively prevents reflection of a UV ray by the substrate, whereby a high-resolution core pattern is formed. With reference to FIG. 2, the action mechanism will be described.

In an optical waveguide 1 falling within the scope of the present invention, a UV-absorbing layer 10 is laminated on a substrate 3 containing an inorganic filler 2, and a lower cladding layer 4 and a core layer 5 are sequentially laminated on the UV-absorbing layer 10. A core pattern 6 of interest is formed in the core layer 5 through irradiation with a UV ray 8 via a photomask 7. According to the present invention, the UV ray is not reflected by the inorganic filler 2 contained in the substrate during light exposure, whereby a core pattern of interest can be formed at high resolution. Specifically, a high-resolution core pattern having a line width/line space ratio of about 50 μm/50 μm or higher can be formed.

In order to effectively prevent UV ray reflection by the aforementioned substrate, the aforementioned UV-absorbing layer preferably has a UV transmittance of 50% or less at a wavelength of the light exposure. UV transmittance is considered to be an index representing UV-absorbing performance of the UV-absorbing layer. Thus, the smaller the UV transmittance is, the more effective the effect of preventing UV ray reflection by the substrate is. The UV transmittance of the UV-absorbing layer is determined by the type and amount of UV-absorbing agent, and the thickness of the UV-absorbing layer. Specifically, a UV transmittance of 50% or less is preferred, since reflection of a UV ray by the substrate is satisfactorily prevented. From this viewpoint, the UV transmittance at a wavelength of the light exposure is more preferably 40% or less.

The wavelength of the light exposure, which is a parameter selected in the design of the optical waveguide, is determined by a factor such as the type of the initiator employed. Specifically, 254 nm, 333 nm, 365 nm, 406 nm, 426 nm, etc. can be selected, but the wavelength of the light exposure is not limited thereto. It is preferable that a process through photolithography can be performed so as to enhance flexibility in mounting parts on the substrate.

In order to attain the same effect as that of the present invention, one possible approach is to incorporate a UV-absorbing agent into a substrate. However, if this approach is employed, the selection of the substrate is problematically limited. In contract, according to the present invention, any substrate can be used. Thus, the effect of the present invention can be more readily attained.

The substrate employed in the optical waveguide of the present invention is a resin substrate which is formed from a resin composition including a base resin (e.g., thermoplastic resin) and an inorganic filler. By virtue of the incorporated inorganic filler, mechanical and thermal characteristics of the substrate are improved.

As described above, it is important in the present invention to prevent reflection of a UV ray by the inorganic filler contained in the substrate. Therefore, it is presupposition in the present invention that a substrate containing an inorganic filler is employed.

No particular limitation is imposed on the type of the inorganic filler, and, for example, calcium carbonate, alumina, titanium oxide, mica, aluminum carbonate, aluminum hydroxide, magnesium silicate, aluminum silicate, silica, glass chopped strand, and whiskers (e.g., aluminum borate whisker and silicon carbide whisker) may be used. Among them, silica is preferred from the viewpoints of improvement effects on mechanical and thermal characteristics of the substrate, handling of the filler, etc.

These inorganic fillers may be used singly or in combination of two or more species.

No particular limitation is imposed on the amount of the inorganic filler incorporated into the substrate. The ratio of the amount of inorganic filler to the total solid content of the resin composition (e.g., resin composition varnish) is generally about 15 to about 75 vol. %. When the amount of inorganic filler is 15 to 75 vol. %, sufficient mechanical and thermal characteristics can be attained. From the aforementioned viewpoints, the inorganic filler content is preferably 20 to 70 vol. %, more preferably 25 to 65 vol. %.

No particular limitation is imposed on the method for determining the amount of inorganic filler. Generally, the ratio of mass of inorganic component remaining after heating the cured resin composition at about 400 to about 700° C. to mass of the cured resin composition containing the inorganic filler is calculated, and the ratio is converted to a volume-based ratio with the specific weight of the cured resin composition containing no inorganic filler and that of the inorganic filler.

In order to enhance dispersibility of the inorganic filler in the cured resin composition, a silicone polymer may be added to the resin composition as described in, for example, JP 2000-301534A. The inorganic filler is preferably surface-treated with the silicone polymer.

The silicone polymer may be directly added to the inorganic-filler-containing resin composition, through which the inorganic filler is surface-treated with the silicone polymer.

No particular limitation is imposed on the thermoplastic resin serving as the base of the thermoplastic resin composition, so long as the resin can be used as an optical waveguide substrate. Thermoplastic resins for general purposes may be employed. Examples of preferred resins include epoxy resin, bismaleimide resin, polyimide resin, phenolic resin, and unsaturated polyester resin. Of these, epoxy resin is preferred.

Any epoxy resin may be used, so long as it is a compound having two or more epoxy groups in the molecule thereof. Examples of the epoxy resin include epoxy resins which are phenol glycidyl ethers, i.e., phenol epoxy resins such as phenol novolak epoxy resin, cresol novolak epoxy resin, resol epoxy resin, and bisphenol epoxy resin; alicyclic epoxy resin; epoxidized polybutadiene; glycidyl ester epoxy resin; glycidylamine epoxy resin; isocyanurate epoxy resin; and flexible epoxy resin.

These polyfunctional epoxy resins may be used singly or in combination of two or more species.

In the case where an epoxy resin is used as a thermoplastic resin, a curing agent and a curing accelerator are used for curing the epoxy resin.

Examples of the curing agent include novolak phenolic resins, dicyan diamide, acid anhydrides, and amines. Examples of the curing accelerator include imidazoles. These agents may be used singly or in combination of two or more species.

The curing agent or the curing accelerator is incorporated in an amount in response to the amount of the polyfunctional epoxy resin. Generally, the curing agent may be used in an amount of 0.05 to 5 parts by mass, and the curing accelerator 0.01 to 10 parts by mass, with respect to 100 parts by mass of epoxy resin.

No particular limitation is imposed on the material of the UV-absorbing layer of the present invention, so long as the UV-absorbing layer has, as mentioned in detail hereinbelow, a thickness of 10 to 50 μm and a UV transmittance of the UV-absorbing layer at a wavelength of the light exposure is preferably 50% or less, but the following material is preferred. That is, the material is preferably formed from a photosensitive resin composition including (A) a thermoplastic polymer having a carboxyl group serving as a binder, (B) a photopolymerizable compound having a polymerizable ethylenically unsaturated group in the molecule thereof, and (C) a photopolymerization initiator. The photosensitive resin composition is particularly preferred, when the UV-absorbing layer is patterned through alkali development.

The thermoplastic polymer (component (A)) is preferably a vinyl copolymer. Examples of the copolymerizable monomer for forming the vinyl copolymer include acrylic acid, methacrylic acid, methyl methacrylate, butyl methacrylate, 2-ethylhexyl methacrylate, lauryl methacrylate, ethyl acrylate, methyl acrylate, styrene, α-methylstyrene, vinyltoluene, N-vinylpyrrolidone, 2-hydroxyethyl methacrylate, 2-hydroxyethyl acrylate, acrylamide, acrylonitrile, methacrylonitrile, dimethylaminoethyl methacrylate, dimethylaminoethyl acrylate, and half ester of styrene-maleic acid copolymer. These monomers may be used singly or in combination of two or more species. Notably, among these polymers, a carboxyl-group-having polymer may be used singly, and a polymer having no carboxyl group is used as a copolymer component bonded to a carboxyl-group-having polymer.

The component (A) preferably has a weight average molecular weight of 20,000 to 300,000. When the weight average molecular weight is 20,000 or higher, a stable UV-absorbing layer can be formed. Also, when the UV-absorbing layer is formed by use of a UV-absorbing film, sufficient film properties can be attained. When the component (A) has a weight average molecular weight of 300,000 or lower, sufficient developability can be attained in the formation of core patterns. From these viewpoints, the weight average molecular weight is more preferably 40,000 to 150,000.

The component (A) preferably has a carboxyl group content of 15 to 50 mol %. When the carboxyl group content is 15 mol % or higher, sufficient developability can be attained in the formation of core patterns. When the carboxyl group content is 50 mol % or less, core patterns are formed in a favorable manner.

The component (A) is preferably soluble or swellable in aqueous alkali solution, from the viewpoint of alkali development.

Next, the component (B) is a photopolymerizable compound having a polymerizable ethylenically unsaturated group in the molecule thereof, and the photopolymerizable compound preferably includes a urethane compound having an ethylenically unsaturated group. The urethane compound having an ethylenically unsaturated group can be produced through reaction between a urethane compound having an isocyanate group at each end and a hydroxyl-group-having ethylenically unsaturated compound, and the urethane compound having an isocyanate group at each end can be produced through reaction between a polycarbonate compound having a hydroxyl group at each end and a diisocyanate compound.

Next, the method for producing a urethane compound having an ethylenically unsaturated group, a preferred embodiment of the component (B), will be described in detail.

As described above, the starting materials employed in the production method are (a) a polycarbonate compound having a hydroxyl group at each end and (b) a diisocyanate compound.

The (a) polycarbonate compound having a hydroxyl group at each end has a structure in which alkylene groups are linked via carbonate bonding to form a main chain and can be produced through a known method (e.g., phosgene method); i.e., through reaction between a dialkyl carbonate (e.g., bisphenol A) and a diol compound.

Examples of the diol compound include diethylene glycol, triethylene glycol, tetraethylene glycol, tripropylene glycol, polypropylene glycol, ethylene glycol, 1,2-propanediol, 1,3-butanediol, 1,4-butanediol, 2-methyl-1,3-butanediol, neopentyl glycol, 2-methylpentanediol, 3-methylpentanediol, 2,2,4-trimethyl-1,6-hexanediol, 3,3,5-trimethyl-1,6-hexanediol, 2,3,5-trimethyl-pentanediol, 1,6-hexanediol, and 1,5-pentanediol. These diol compounds may be used singly or in combination of two or more species. Polyol compounds such as trimethylolpropane, trimethylolethane, hexanetriol, heptanetriol, and pentaerythritol may be included.

Among the above polycarbonate compounds, preferred is a polycarbonate compound having hexamethylene carbonate and pentamethylene carbonate as repeating units produced from 1,6-hexanediol and 1,5-pentanediol. The hexamethylene carbonate/pentamethylene carbonate content ratio is preferably 1/9 to 9/1 (by mole). When the ratio falls within the range, sufficient elongation and strength can be attained. The polycarbonate compound preferably has a number average molecular weight (measured through, for example, GPC, and reduced to polystyrene) of 600 to 1,000. When the number average molecular weight falls within the range, sufficient elongation and strength can be attained.

Examples of the (b) diisocyanate compound include 2,4-toluene diisocyanate, 2,6-toluene diisocyanate, isophorone diisocyanate, hexamethylene diisocyanate, diphenylmethane diisocyanate, (o, p, or m)-xylene diisocyanate, methylenebis(cyclohexyl)diisocyanate, trimethylhexamethylene diisocyanate, 1,3- or 1,4-(isocyanatomethyl)cyclohexane, 1,5-naphthalene diisocyanate, triphenylmethane triisocyanate, tris(isocyanatophenyl)thiophosphate, 2,4-tolylene diisocyanate or 2,6-tolylene diisocyanate dimer, organic isocyanates (isocyanurate-modified products of the above-mentioned organic isocyanates), carbodiimide-modified products, and biuret-modified products. Of these, isophorone diisocyanate is preferred.

Then, the (a) polycarbonate compound having a hydroxyl group at each end is reacted with the (b) diisocyanate compound, to thereby yield (c) a urethane compound having an isocyanate group at each end. In the reaction, the amount ratio of component (b) to component (a) is preferably 1.01 to 2.0 mol of component (b) with respect to 1 mol of component (a), more preferably 1.1 to 2.0 mol/1 mol.

When the amount of (b) diisocyanate compound falls within the range, (c) a urethane compound having an isocyanate group at each end can be stably produced. The reaction is preferably performed in the presence of dibutyltin dilaurylate as a catalyst. The reaction temperature is preferably 60 to 120° C. When the reaction temperature is 60° C. or higher, reaction proceeds sufficiently, whereas when the temperature is 120° C. or lower, danger in operation which would otherwise be caused by sudden temperature rise can be prevented.

Then, (d) a hydroxyl-group-having ethylenically unsaturated compound is added to the (c) urethane compound having an isocyanate group at each produced from the components (a) and (b), to thereby yield an urethane compound having an ethylenically unsaturated group.

The (d) hydroxyl-group-having ethylenically unsaturated compound employed therein is preferably a compound having a hydroxyl group and an acryloyl group in the molecule thereof. Examples of such compounds include hydroxy (meth)acrylates such as 2-hydroxyethyl methacrylate, 2-hydroxyethyl acrylate, hydroxypropylacrylate, and hydroxybutylacrylate; caprolactone adducts such as hydroxyethyl acrylate-caprolactone adduct, hydroxypropyl acrylate-caprolactone adduct, and hydroxybutyl acrylate-caprolactone adduct; alkylene oxide adducts such as hydroxyethyl acrylate-alkylene oxide adduct, hydroxypropyl acrylate-propylene oxide adduct, and hydroxyethyl acrylate-butylene oxide adduct; and glycerin monoacrylate, glycerin diacrylate, glycidylmethacrylate-acrylic acid adduct, trimethylolpropane monoacrylate, pentaerythritol triacrylate, dipentaerythritol triacrylate, ditrimethylolpropane triacrylate, trimethylolpropane-ethylene oxide adduct diacrylate, and trimethylolpropane-propylene oxide adduct diacrylate.

In the above addition reaction, the amount ratio of component (d) to component (c) is preferably 2 to 2.4 mol to 1 mol. When the amount is 2 mol or more, sufficient photopolymerizability can be attained, whereas when the amount is 2.4 or less, sufficient elongation and strength can be attained. The addition reaction is preferably performed in the presence of p-methoxyphenol, di-t-butyl-hydroxytoluene, or a similar compound. In addition, dibutyltin dilaurylate is preferably used as a catalyst.

The reaction temperature is preferably 60 to 90° C. When the reaction temperature is 60° C. or higher, reaction proceeds sufficiently, whereas when the temperature is 90° C. or lower, gelling which would otherwise be caused by sudden temperature rise can be prevented. The end point of the reaction can be detected by confirming disappearance of isocyanate groups through infrared absorption spectrometry.

The urethane compound of the present invention containing an ethylenically unsaturated group preferably has a number average molecular weight of 1,000 to 100,000. When the number average molecular weight is 1,000 or higher, sufficient elongation and strength can be attained, whereas when the molecular weight is 100,000 or less, excellent compatibility with the aforementioned (A) thermoplastic polymer having a carboxyl group is attained.

The photosensitive resin composition of the present invention generally contains (C) a photopolymerization initiator which releases free radicals through an active ray. Examples of the photopolymerization initiator which can serve as the component (C) include substituted or non-substituted polynucleic quinones such as 2-ethylanthraquinone, 2-t-butylanthraquinone, octamethylanthraquinone, 1,2-benzanthraquinone, and 2,3-diphenylanthraquinone; α-ketaldonyl alcohols such as benzoin and pivalone; ethers; α-hydrocarbon-substituted aromatic acyloins such as α-phenyl-benzoin and α,α-diethoxyacetophenone; aromatic ketones such as benzophenone and 4,4'-bisdialkylaminobenzophenone; thioxanthones such as 2-methylthioxanthone, 2,4-diethylthioxanthone, 2-chlorothioxanthone, 2-isopropylthioxanthone, and 2-ethylthioxanthone; and 2-methyl-1-[4-(methylthio)phenyl]-2-morpholino-propanone-1. These compounds may be used singly or in combination of two or more species.

The amount of component (B) incorporated into the aforementioned photosensitive resin composition is preferably adjusted to 10 to 70 mass % with respect to the total amount of components (B) and (A). The amount of component (A) is preferably adjusted to 30 to 90 mass % with respect to the total amount of components (A) and (B). When the amount of component (A) is 30 mass % or more, suitable alkali developability can be attained, and a photosensitive film formed from the resin composition has a photosensitive resin composition layer having a suitable hardness on a base film, thereby preventing oozing of ingredients of the composition. When the amount of component (A) is 90 mass % or less, sufficient UV ray absorption performance can be attained, and the optical waveguide of the present invention produced from the resin composition has a sufficient resistance to solder heat, which is required for use as an electrical substrate.

In the present invention, the amount of component (C) is preferably adjusted to 0.01 to 20 parts by mass with respect to the total amount of components (A) and (B) as 100 parts by mass. When the amount of component (C) is 0.01 parts by mass or more, sufficient sensitivity to photopolymerization can be attained, whereas when the amount is 20 parts by mass or less, the optical waveguide of the present invention produced from the resin composition has a sufficient resistance to solder heat, which is required for use as an electrical substrate.

If required, the photosensitive resin composition of the present invention may further contain a thermally curing component (e.g., melamine resin), a dye, a pigment, a plasticizer, a stabilizer, etc. In the present invention, these additives preferably have UV-absorbing performance, since the effect of the present invention can be further enhanced.

The UV-absorbing layer may be formed on the substrate through any of a variety of methods. One exemplary method includes making a varnish of the photosensitive resin composition for forming the UV-absorbing layer and applying the varnish to the substrate. Another exemplary method includes forming a UV-absorbing film (photosensitive film) in advance and dry-laminating the film on the substrate (including heating and pressing under specific conditions). Of these, the method employing UV-absorbing film is preferred, in consideration of absence of inconvenience caused by liquid-form resin material, easy realization of large-area application, flatness of the UV-absorbing layer, easy operation, and other factors. As described above, in the present invention, the UV-absorbing layer preferably has a UV transmittance of 50% or less at a wavelength of the light exposure. When a UV-absorbing film is employed, it is advantageous that the UV transmittance of the UV-absorbing layer can readily controlled by controlling the UV transmittance of the UV-absorbing film at a wavelength of the light exposure.

When the photosensitive resin composition is applied in the form of varnish, any known solvent in which the photosensitive resin composition is soluble can be used, and no particular limitation is imposed on the solvent. Note that when the photosensitive resin composition is in the liquid form, solvent may be omitted.

Examples of the solvent include water, methanol, ethanol, propyl alcohol, butyl alcohol, acetone, methyl ethyl ketone, toluene, xylene, dioxane, N,N-dimethylformamide, and ethylene glycol monomethyl ether. These solvents may be used singly or in combination of two or more species.

The UV-absorbing layer-forming resin varnish generally has a solid content of 30 to 80 mass %, preferably 35 to 75 mass %, more preferably 40 to 70 mass %.

The UV-absorbing film can be readily formed by applying the aforementioned resin varnish for forming the UV-absorbing layer on the base film, and removing the solvent.

The base film is employed as a support for the UV-absorbing film. No particular limitation is imposed on the material of the base film and, for example, polyester such as polyethylene terephthalate (PET), polypropylene or polyethylene, etc. may be employed, from the viewpoints of UV-absorbing film peelability, heat resistance, and solvent resistance. The aforementioned base film may be subjected to mold release treatment, anti-charging treatment, etc., in order to facilitate the peeling performed thereafter.

The base film generally has a thickness of 5 to 50 µm. When the thickness of the base film is 5 µm or more, the strength for serving as a support can be readily attained, whereas when the thickness is 50 µm or less, winding performance during formation of rolled products is enhanced. From these viewpoints, the base film is preferably 10 to 40 µm, more preferably 15 to 30 µm.

Onto the UV-absorbing film, a protective film may be laminated, in consideration of protection of the UV-absorbing film, winding performance during formation of rolled products, and other factors.

The protective film may be made of the same material as exemplified in relation to the base film, and may be subjected to mold release treatment or anti-charging treatment, if required.

The UV-absorbing layer of the present invention is required to have a thickness of 10 to 50 µm. When the thickness is less than 10 µm, reflection of a UV ray by the substrate cannot be sufficiently suppressed, failing to produce high-resolution core patterns. When the thickness is in excess of 50 µm, there are problems such as a long curing time required for forming the UV-absorbing layer, a large warpage of the UV-absorbing layer by shrinkage during curing, and a peel of the UV-absorbing layer from the substrate due to the difficulty of light exposure up to the bottom of the UV-absorbing layer (i.e., a bonding surface to the substrate) at the light exposure and development steps. Furthermore, such a large thickness is economically disadvantageous. From these viewpoints, the UV-absorbing layer preferably has a thickness of 20 to 40 µm.

When the UV-absorbing layer is formed from a UV-absorbing film, the thickness of the UV-absorbing film is adjusted to 10 to 50 µm, which is similar to the case of thickness of the UV-absorbing layer.

In a preferred manner, the optical waveguide of the present invention is produced by use of an optical waveguide-forming resin film as a material to form at least one of the lower cladding layer, the core layer, and the upper cladding layer.

Through employment of an optical waveguide-forming resin film, no problem caused by liquid resin material occurs, and a flexible optical waveguide suitable for large area applications can be produced.

An optical waveguide-forming resin film used for producing the cladding layer of the present invention (hereinafter referred to as "cladding layer-forming resin film) is produced from a cladding layer-forming resin and, if required, produced by applying the cladding layer-forming resin onto the base film.

An optical waveguide-forming resin film used for producing the core layer of the present invention (hereinafter referred to as "core layer-forming resin film) is produced from a core layer-forming resin and, if required, produced by applying the core layer-forming resin onto the base film.

Regarding the optical waveguide-forming resin films for forming the optical waveguide of the present invention, the cured product of the core layer-forming resin film is designed to have a refractive index higher than that of a cured product of an optical waveguide-forming resin film for forming the cladding layer.

No particular limitation is imposed on the cladding layer-forming resin for forming the cladding layer-forming resin film of the present invention, so long as the cure product of the cladding-forming resin film exhibits a refractive index lower than that of the cured product of the core layer-forming resin film, and the cladding layer-forming resin can be cured by light or heat. Thermoplastic resins and photosensitive resins may be employed.

The cladding layer-forming resin is preferably formed from a resin composition containing (i) a base polymer, (ii) a photopolymerizable compound, and (iii) a photopolymerization initiator.

The (i) base polymer serves for forming the cladding layer and ensuring strength thereof, and is not particularly limited as long as these objects can be achieved. Examples of the base polymer include phenoxy resin, epoxy resin, (meth)acrylic resin, polycarbonate resin, polyarylate resin, polyetheramide, polyether-imide, polyether sulfone, and derivatives thereof.

Meanwhile, the "(meth)acrylic resin" as used herein means both an acrylic resin and a methacrylic resin.

These base polymers may be used singly or in combination of two or more species.

Among the aforementioned (i) base polymers, from the viewpoint of high heat resistance, preferred are those having an aromatic skeleton in a main chain thereof, and more preferred are phenoxy resins.

Also, from the viewpoint of enhancing the heat resistance by virtue of a three-dimensional crosslinked structure thereof preferred are epoxy resins, and more preferred are those epoxy resins that remain in a solid state at room temperature.

Furthermore, in order to ensure good transparency of the cladding layer-forming resin film, it is important that the base polymer (i) exhibits good compatibility with the below-mentioned photopolymerizable compound (II). From this viewpoint, among the base polymers, phenoxy resin and (meth)acrylic resin are preferred.

Among the above phenoxy resins, phenoxy resins containing bisphenol A, a bisphenol A-type epoxy compound or a derivative thereof; and bisphenol F, a bisphenol F-type epoxy compound or a derivative thereof as structural units for copolymer are more preferred, since they are excellent in heat resistance, adhesion, and dissolvability.

Examples of preferred derivatives of bisphenol A and the bisphenol A-type epoxy compound include tetrabromobisphenol A and tetrabromobisphenol A-type epoxy compounds. Examples of preferred derivatives of bisphenol F or the bisphenol F-type epoxy compound include tetrabromobisphenol F and tetrabromobisphenol F-type epoxy compounds.

Specific examples of bisphenol A/bisphenol F copolymer-type phenoxy resin include "PHENOTOHTO YP-70" (tradename, product of Tohto Kasei Co., Ltd.).

As described above, from the viewpoint of enhancing the heat resistance by virtue of a three-dimensional crosslinked structure thereof, preferred (i) base polymers are epoxy resins, and more preferred are those epoxy resins that remain in a solid state at room temperature.

Examples of the epoxy resins that remain in a solid state at room temperature include bisphenol A-type epoxy resins such as "EPOTOHTO YD-7020", "EPOTOHTO YD-7019," and "EPOTOHTO YD-7017" (all of them are tradenames and products of Tohto Kasei Co., Ltd.), and "EPICOAT 1010", "EPICOAT 1009," and "EPICOAT 1008" (all of them are tradenames and products of Japan Epoxy Resins Co., Ltd.).

The molecular weight of the (i) base polymer is generally 5,000 or higher as a number average molecular weight, from the viewpoint of film formability. The number average molecular weight is preferably 10,000 or higher, more preferably 30,000 or higher.

No particular limitation is imposed on the upper limit of the number average molecular weight, but it is generally 1,000,000 or lower, from the viewpoints of compatibility with the (ii) photopolymerizable compound and the light exposure and development ability.

The upper limit of the number average molecular weight is preferably 500,000 or lower, more preferably 200,000 or lower.

The number average molecular weight is obtained by measuring through gel permeation chromatography (GPC) and reducing the values with standard polystyrene.

The amount of (i) base polymer is generally about 10 to about 80 mass %, with respect to the total amount of base polymer as the component (i) and photopolymerizable compound as the component (ii).

When the amount of base polymer (i) is 10 mass % or more, a thick film having a thickness of about 50 to 500 μm required for forming an optical waveguide can be readily formed, which is advantageous, whereas when the amount is 80 mass % or less, photocuring reaction sufficiently proceeds.

From these viewpoints, the amount of component (i) is preferably 20 to 70 mass %, more preferably 25 to 65 mass %.

No particular limitation is imposed on the (ii) photopolymerizable compound, so long as it is capable of being polymerized by irradiation with light such as ultraviolet light. Examples of the (ii) photopolymerizable compound include a compound having two or more epoxy groups in the molecule thereof and a compound having an ethylenically unsaturated group in the molecule thereof.

Specific examples of the compound having two or more epoxy groups in the molecule thereof include bi-functional aromatic glycidyl ethers such as bisphenol A epoxy resin, tetrabromobisphenol A epoxy resin, bisphenol F epoxy resin, bisphenol AD epoxy resin, and naphthalene-type epoxy resin; poly-functional aromatic glycidyl ethers such as phenol novolak epoxy resin, cresol novolak epoxy resin, dicyclopentadiene-phenol epoxy resin, and tetraphenylolethane epoxy resin; bi-functional aliphatic glycidyl ethers such as polyethylene glycol epoxy resin, polypropylene glycol epoxy resin, neopentyl glycol epoxy resin, and hexanediol epoxy resin; bi-functional alicyclic glycidyl ethers such as hydrogenated bisphenol A epoxy resin; poly-functional aliphatic glycidyl ethers such as trimethylolpropane epoxy resin, sorbitol epoxy resin, and glycerin epoxy resin; bi-functional aromatic glycidyl esters such as phtalic acid diglycidyl ester; bi-functional alicyclic glycidyl esters such as tetrahydrophthalic acid diglycidyl ester and hexahydrophthalic acid diglycidyl ester; bi-functional aromatic glycidylamines such as N,N-diglycidylaniline and N,N-diglycidyltrifluoromethylaniline; poly-functional aromatic glycidylamines such as N,N,N',N'-tetraglycidyl-4,4-diaminodiphenylmethane, 1,3-bis(N,N-glycidylaminomethyl)cyclohexane, and N,N,O-triglycidyl-p-aminophenol; bi-functional alicyclic epoxy resins such as alicyclic diepoxyacetal, alicyclic diepoxyadipate, alicyclic diepoxycarboxylate, and vinylcyclohexene dioxide; bi-functional heterocyclic epoxy resins such as diglycidylhydantion; poly-functional heterocyclic epoxy resins such as triglycidyl isocyanurate; and bi-functional or poly-functional silicon-containing epoxy resin such as organopolysiloxane epoxy resin.

These compounds each having two or more epoxy groups in the molecule thereof and employed in the invention generally have a molecular weight of 100 to 2,000 and are in the liquid form at room temperature. The molecular weight is preferably 150 to 1,000, more preferably 200 to 800.

These compounds may be used singly or in combination of two or more species, and may be combined with another photopolymerizable compound.

The molecular weight may be determined through gel permeation chromatography (GPC) or mass analysis.

Specific examples of the compound having an ethylenically unsaturated group in the molecule thereof include (meth)acrylates, vinylidene halides, vinyl ethers, vinylpyridine, and vinyl phenol. Of these, (meth)acrylates are preferred from the viewpoint of transparency and heat resistance. Any of such compounds having mono-function, bi-function, and tri- or more-functions may be employed.

Examples of the mono-functional (meth)acrylate include methoxypolyethylene glycol(meth)acrylate, phenoxypolyethylene glycol(meth)acrylate, lauryl(meth)acrylate, isostearyl(meth)acrylate, 2-(meth)acryloyloxyethylsuccinic acid, p-cumylphenoxyethylene glycol(meth)acrylate, 2-tetrahydropyranyl(meth)acrylate, isobornyl(meth)acrylate, methyl(meth)acrylate, ethyl(meth)acrylate, butyl(meth)acrylate, and benzyl(meth)acrylate.

Examples of the bi-functional (meth)acrylate include ethoxylated 2-methyl-1,3-propanediol di(meth)acrylate, neopentyl glycol di(meth)acrylate, 1,6-hexanediol di(meth)acrylate, 2-methyl-1,8-octanediol diacrylate, 1,9-nonanediol di(meth)acrylate, 1,10-decanediol di(meth)acrylate, ethoxylated polypropylene glycol di(meth)acrylate, propoxylated ethoxylated bisphenol A diacrylate, ethylene glycol di(meth)acrylate, triethylene glycol di(meth)acrylate, tetraethylene glycol di(meth)acrylate, polyethylene glycol di(meth)acrylate, polypropylene glycol di(meth)acrylate, ethoxylated bisphenol A di(meth)acrylate, tricyclodecane di(meth)acrylate, ethoxylated cyclohexane dimethanol di(meth)acrylate, 2-hydroxy-1-acryloxy-3-methacryloxypropane, 2-hydroxy-1,3-dimethacryloxypropane, 9,9-bis[4-(2-acryloyloxyethoxy)phenyl]fluorene, 9,9-bis[3-phenyl-4-acryloylpolyoxyethoxy)fluorene, and bisphenol A epoxy(meth)acrylate, phenol novolak epoxy(meth)acrylate, cresol novolak epoxy(meth)acrylate, and glycidyl ether epoxy(meth)acrylate.

Examples of the tri- or more-functional (meth)acrylate include ethoxylated isocyanuric acid tri(meth)acrylate, ethoxylated glycerin tri(meth)acrylate, trimethylolpropane tri(meth)acrylate, ethoxylated trimethylolpropane tri(meth)acrylate, pentaerythritol tri(meth)acrylate, pentaerythritol tetra(meth)acrylate, ethoxylated pentaerythritol tetra(meth)acrylate, propoxylated pentaerythritol tetra(meth)acrylate, ditrimethylolpropane tetra(meth)acrylate, caprolactone-modified ditrimethylolpropane tetra(meth)acrylate, and dipentaerythritol hexa(meth)acrylate.

These (meth)acrylates may be used singly or in combination of two or more species.

Meanwhile, the "(meth)acrylate" as used herein means both an acrylate and a methacrylate.

The amount of (ii) photopolymerizable compound is generally about 20 to about 90 mass %, with respect to the total amount of (i) base polymer and (ii) photopolymerizable compound.

When the amount is 20 mass % or more, the photopolymerizable compound and the base polymer are readily cross-linked to form a cured product, whereas when the amount is 90 mass % or less, a cladding layer having a sufficient thickness can be readily formed.

From these viewpoints, the amount of component (ii) is preferably 25 to 85 mass %, more preferably 30 to 80 mass %.

No particular limitation is imposed on photopolymerization initiator as the component (iii). Examples of epoxy compound serving as the initiator include aryldiazonium salts such as p-methoxybenzenediazonium hexafluorophosphate; diaryliodonium salts such as diphenyliodonium hexafluorophosphonium and diphenyliodonium hexafluoroantimonate; triarylsulfonium salts such as triphenylsulfonium hexafluorophosphonium, triphenylsulfonium hexafluoroantimonate, diphenyl-4-thiophenoxyphenylsulfonium hexafluoroantimonate, and diphenyl-4-thiophenoxyphenylsulfonium pentafluorohydroxyantimonate; triarylselenium salts such as triphenylselenonium hexafluorophosphonium, triphenylselenonium borofluoride, and triphenylselenonium hexafluoroantimonate; dialkylphenacylsulfonium salts such as dimethylphenacylsulfonium hexafluoroantimonate and diethylphenacylsulfonium hexafluoroantimonate; dialkyl-4-hydroxyphenylsulfonium salts such as 4-hydroxyphenyldimethylsulfonium hexafluoroantimonate and 4-hydroxyphenylbenzylmethylsulfonium hexafluoroantimonate; and sulfonic acid esters such as α-hydroxymethylbenzoin sulfonate, N-hydroxyimide sulfonate, α-sulfonyloxy ketone, and β-sulfonyloxy ketone.

Examples of compound having an ethylenically unsaturated group in the molecule thereof serving as the initiator include aromatic ketones such as benzophenone, N,N'-tetramethyl-4,4'-diaminobenzophenone (Michler's ketone), N,N'-tetraethyl-4,4'-diaminobenzophenone, 4-methoxy-4'-dimethylaminobenzophenone, 2-benzyl-2-dimethylamino-1-(4-morpholinophenyl)-butan-1-one, 2,2-dimethoxy-1,2-diphenylethan-1-one, 1-hydroxycyclohexyl phenyl ketone, 2-hydroxy-2-methyl-1-phenylpropan-1-one, 1-[4-(2-hydroxyethoxy)phenyl]-2-hydroxy-2-methyl-1-propan-1-one, and 1,2-methyl-1-[4-(methylthio)phenyl]-2-morpholinopropan-1-one; quinones such as 2-ethylanthraquinone, phenanthrenequinone, 2-tert-butylanthraquinone, octamethylanthraquinone, 1,2-benzanthraquinone, 2,3-benzanthraquinone, 2-phenylanthraquinone, 2,3-diphenylanthraquinone, 1-chloroanthraquinone, 2-methylanthraquinone, 1,4-naphthoquinone, 9,10-phenanthraquinone, 2-methyl-1,4-naphthoquinone, and 2,3-dimethylanthraquinone; benzoin ether compounds such as benzoinmethyl ether, benzoin ethyl ether, and benzoinphenyl ether; benzoin compounds such as benzoin, methylbenzoin, and ethylbenzoin; benzil derivatives such as benzil dimethyl ketal; 2,4,5-triarylimidazole dimers such as 2-(o-chlorophenyl)-4,5-diphenylimidazole dimer, 2-(o-chlorophenyl)-4,5-di(methoxyphenyl)imidazole dimer, 2-(o-fluorophenyl)-4,5-diphenylimidazole dimer, 2-(o-methoxyphenyl)-4,5-diphenylimidazole dimer, and 2-(p-methoxyphenyl)-4,5-diphenylimidazole dimer; phosphine oxides such as bis(2,4,6-trimethylbenzoyl)phenylphosphine oxide, bis(2,6-dimethoxybenzoyl)-2,4,4-trimethylpentylphosphine oxide, and 2,4,6-trimethylbenzoyldiphenylphosphine oxide; acridine derivatives such as 9-phenylacridine and 1,7-bis(9,9'-acridinyl)heptane; N-phenylglycine; N-phenylglycine derivatives; and coumarin compounds.

In terms of substituents of two aryl groups, the 2,4,5-triarylimidazole dimer may be a symmetric dimer (the same substituents) or an asymmetric dimer (different substituents).

A thioxanthone compound and a tertiary amine may be used in combination (e.g., diethylthioxanthone and dimethylaminobenzoic acid).

Among these photopolymerization initiators, aromatic ketones and phosphine oxides are preferred, from the viewpoint of enhancing the transparency of the core layer and the cladding layer.

These (iii) photopolymerization initiators may be used singly or in combination of two or more species.

The amount of (iii) photopolymerization initiator is generally about 0.1 to about 10 parts by mass, with respect to the total amount of (i) base polymer and (ii) photopolymerizable compound as 100 parts by mass.

When the amount is 0.1 parts by mass or more, sufficient photosensitivity is attained, whereas when the amount is 10 parts by mass or less, curing only the surface of the optical waveguide leading to insufficient curing is prevented, and transmission loss which would otherwise be caused by self-absorption of the photopolymerization initiator is prevented.

From these viewpoints, the amount of component (iii) is preferably 0.5 to 5 parts by mass, more preferably 1 to 4 parts by mass.

The cladding layer-forming resin of the present invention may further contain, if required, so-called additives such as an antioxidant, a yellowing inhibitor, a UV-absorbing agent, a visible light-absorbing agent, a colorant, a plasticizer, a stabilizer, and a filler unless the addition thereof gives any adverse influence on the effects of the present invention.

The cladding layer-forming resin may be used as a cladding layer-forming resin varnish, which is produced through dissolving in a solvent a resin composition containing (i) a base polymer, (ii) a photopolymerizable compound, and (iii) a photopolymerization initiator.

The cladding layer-forming resin film can be readily formed by applying the cladding layer-forming resin varnish on the base film, if required, and removing the solvent.

The base film which is optionally employed in the production of the cladding layer-forming resin film serves as a support for the optical waveguide-forming film. No particular limitation is imposed on the material of the base film and, for example, polyester such as polyethylene terephthalate (PET), polypropylene or polyethylene, etc. may be employed, from the viewpoints of cladding layer-forming resin film peelability, heat resistance, and solvent resistance.

The aforementioned base film may be subjected to mold release treatment, anti-charging treatment, etc., in order to facilitate the peeling of a cladding layer-forming resin film performed thereafter.

The base film generally has a thickness of 5 to 50 μm. When the thickness of the base film is 5 μm or more, the strength for serving as a support can be readily attained, whereas when the thickness is 50 μm or less, winding performance during formation of rolled products is enhanced. From these viewpoints, the base film is preferably 10 to 40 μm, more preferably 15 to 30 μm.

Onto the cladding layer-forming film, a protective film may be laminated, in consideration of protection of the cladding layer-forming film, winding performance during formation of rolled products, and other factors.

The protective film may be made of the same material as exemplified in relation to the base film, and may be subjected to mold release treatment or anti-charging treatment, if required.

No particular limitation is imposed on the solvent used for producing the cladding layer-forming resin varnish, so long as it is capable of dissolving the resin composition containing components (i) to (iii). Examples of the solvent which may be employed include acetone, methyl ethyl ketone, methyl cellosolve, ethyl cellosolve, toluene, N,N-dimethylacetamide, propylene glycol monomethyl ether, propylene glycol monomethyl ether acetate, cyclohexanone, N-methyl-2-pyrrolidone, and mixtures thereof.

The cladding layer-forming resin varnish generally has a solid content of 30 to 80 mass %, preferably 35 to 75 mass %, more preferably 40 to 70 mass %.

No particular limitation is imposed on the thickness of the cladding layer-forming resin film, and the thickness is adjusted so that the cladding layer after drying has a thickness generally 5 to 500 μm. When the thickness of the cladding layer is 5 μm or more, the thickness of the cladding layer required for confining light is ensured, whereas when the thickness is 500 μm or less, the thickness of the cladding layer can be readily controlled in a uniform state. From these viewpoints, the thickness of the cladding layer is preferably 10 to 100 μm, more preferably 20 to 90 μm.

In addition, as to the thickness of the cladding layer, the thickness of the lower cladding layer that is first formed may be the same as or different from the thickness of the upper layer serving for embedding the core pattern therein. For the purpose of surely embedding the core pattern, the thickness of the upper cladding layer is preferably larger than that of the core layer.

The cladding layer may alternatively be readily produced by applying a cladding layer-forming resin varnish on the UV-absorbing layer through spin-coating, and removing the solvent.

Next, the core layer-forming resin film employed in the present invention may be formed from a resin composition designed such that the resulting core layer has a higher refractive index than that of the cladding layer, and is capable of producing the core pattern by irradiation with a UV ray. The resin composition is preferably a photosensitive resin composition.

Specifically, a core layer-forming resin composition which is same as that used for the cladding layer-forming resin is preferably employed.

That is, the resin composition contains the aforementioned (i) base polymer, (ii) photopolymerizable compound, and (iii) photopolymerization initiator together with the above optional components, if required.

The core layer-forming resin may be used as a core layer-forming resin varnish, which is produced through dissolving in a solvent a resin composition containing (i) a base polymer, (ii) a photopolymerizable compound, and (iii) a photopolymerization initiator.

The core layer-forming resin film can be readily formed by applying the core layer-forming resin varnish on the base film, if required, and removing the solvent. The base film which is optionally employed in the production of the core layer-forming resin film serves as a support for the optical waveguide-forming film. No particular limitation is imposed on the material of the base film, and the same base film as employed in the production of the cladding layer-forming resin film may also be used.

For example, polyester such as polyethylene terephthalate (PET), polypropylene or polyethylene, etc. may be employed, from the viewpoints of core layer-forming resin film peelability, heat resistance, and solvent resistance.

In order to enhance transmittance of the exposure light beam and to reduce the side roughness of the core pattern, a flexible base film having high transparency is preferably used. The high-transparency base film generally has a haze of 5% or less, preferably 3% or less, more preferably 2% or less.

Such a base film is available as "COSMOSHINE A1517" or "COSMOSHINE A4100" (tradenames, available from Toyobo Co., Ltd.).

The aforementioned base film may be subjected to mold release treatment, anti-charging treatment, etc., in order to facilitate the peeling of a core layer-forming resin film performed thereafter.

The base film generally has a thickness of 5 to 50 μm. When the thickness of the base film is 5 μm or more, the strength for serving as a support can be readily attained, whereas when the thickness is 50 μm or less, the gap between the base film and the mask during pattern formation decreases, thereby forming finer patterns. From these viewpoints, the base film is preferably 10 to 40 μm, more preferably 15 to 30 μm.

Onto the core layer-forming film, a protective film may be laminated, in consideration of protection of the core layer-forming film, winding performance during formation of rolled products, and other factors. The protective film may be made of the same material as exemplified in relation to the base film, and may be subjected to mold release treatment or anti-charging treatment, if required.

No particular limitation is imposed on the solvent used for producing the core layer-forming resin varnish, so long as it is capable of dissolving the resin composition containing components (i) to (iii). Examples of the solvent include acetone, methyl ethyl ketone, methyl cellosolve, ethyl cellosolve, toluene, N,N-dimethylacetamide, propylene glycol monomethyl ether, propylene glycol monomethyl ether acetate, cyclohexanone, N-methyl-2-pyrrolidone, and mixtures thereof.

The core layer-forming resin varnish generally has a solid content of 30 to 80 mass %, preferably 35 to 75 mass %, more preferably 40 to 70 mass %.

No particular limitation is imposed on the thickness of the core layer-forming resin film, and the thickness is controlled so that the thickness of the core layer after drying is generally 10 to 100 μm. When the thickness of the core layer-forming resin film is 10 μm or more, it is advantageous that the positioning tolerance for coupling with light-receiving and light-emitting elements or an optical fiber after the optical waveguide is formed can be increased, whereas when the thickness is 100 μm or less, it is advantageous that the coupling efficiency for coupling with light-receiving and light-emitting elements or an optical fiber after the optical waveguide is formed can be enhanced. From the above viewpoints, the thickness of the core layer-forming resin film is preferably from 29 to 90 μm, more preferably from 30 to 80 μm.

The core layer may alternatively be readily produced by applying a core layer-forming resin varnish on the cladding layer through spin-coating, and removing the solvent.

An embodiment of the method of the present invention for producing an optical waveguide will next be described.

Figure 3:
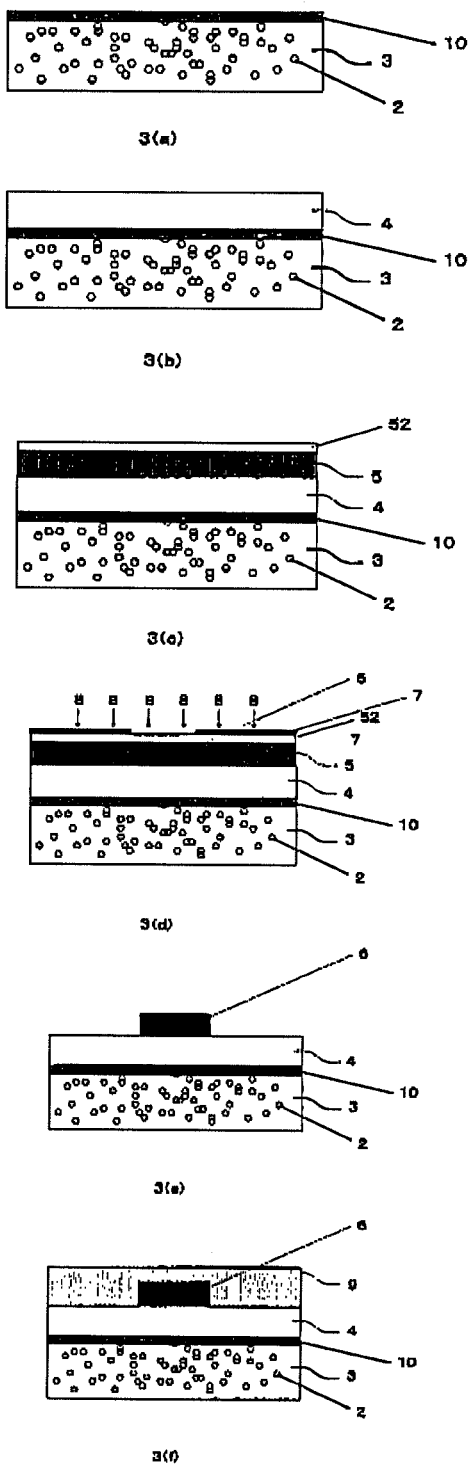
FIG. 3 Sketches describing an exemplary method of producing the optical waveguide of the present invention.

FIG. 3 represents sketches describing an exemplary method of producing the optical waveguide of the present invention.

Figure 4:
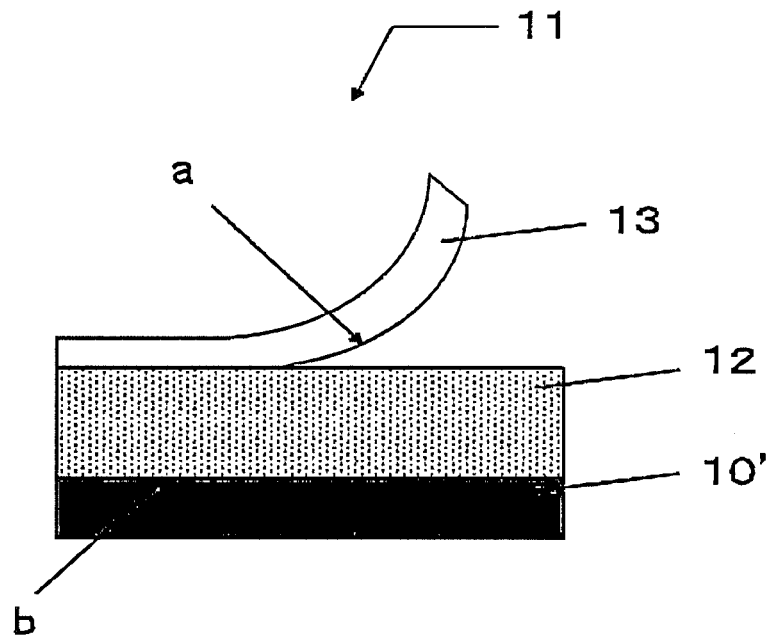
FIG. 4 A schematic view of a UV-absorbing film.

In a first step (see FIG. 3(a) and FIG. 4), a UV-absorbing layer 10 containing an inorganic filler 2 is formed on a substrate 3. As mentioned above, in one method for producing the UV-absorbing layer 10, a UV-absorbing layer-forming resin varnish is applied onto the substrate 3 through spin-coating or a similar technique, and the solvent of the varnish is removed. The varnish is cured by light or heat, to thereby form the UV-absorbing layer 10. However, it is more preferable in the present invention that a UV-absorbing film 11 as shown in FIG. 4 is produced in advance, and the film 11 is laminated on the substrate 3.

As shown in FIG. 4, the UV-absorbing film is formed of a base film 12 on which a UV-absorbing layer 10' is laminated. If desired, a protective film 13 is laminated on the backside of the base film.

In the first step, the UV-absorbing film 11 is pressed under heating to the substrate 3, and the film is cured by light or heat. Then, the base film 12 is peeled off, to thereby laminate the UV-absorbing layer 10. From the viewpoints of good adhesion and enhanced follow-up ability, lamination is preferably conducted under reduced pressure. No particular limitation is imposed on the heating temperature and the pressure for lamination, but the heating temperature is preferably 50 to 130° C., and the lamination pressure is preferably about 0.1 to about 1.0 MPa (1 to 10 kgf/cm$^2$). Notably, when a protective film 13 is provided, the UV-absorbing film 11 is pressed to the substrate 3 under heating after peeling of the protective film 13.

In order to facilitate the peeling from the UV-absorbing film 10', preferably, no adhesion treatment is performed on the protective film 13 or the base film 12. If required, mold release treatment may be performed (see a and b in FIG. 4).

In a second step (see FIG. 3(b)), the first cladding layer-forming resin film on the base film is laminated on the UV-absorbing layer, followed by performing photo- or thermal curing, to thereby form a cladding layer 4.

Figure 5:
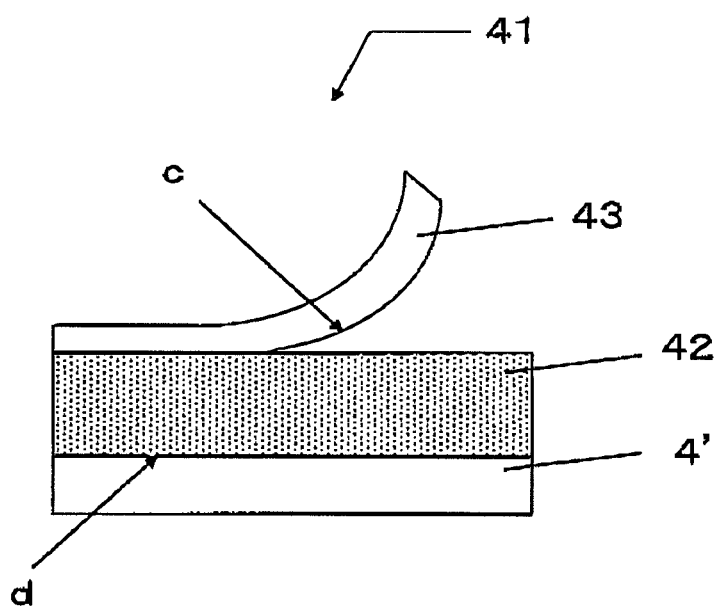
FIG. 5 A schematic view of a lower cladding layer-forming resin film.

In the second step, the cladding layer 4 is laminated on the aforementioned UV-absorbing layer by pressing under heating a cladding layer-forming resin film 41 as shown in FIG. 5. From the viewpoints of good adhesion and enhanced follow-up ability, lamination is preferably conducted under reduced pressure, and the lamination conditions are the same as those employed in the aforementioned lamination of the UV-absorbing layer. In the case where a protective film 43 is formed on the backside of the base film 42 in the cladding layer-forming resin film (see FIG. 5), the protective film 43 is peeled of Then, the cladding layer-forming resin film 42 is pressed to the UV-absorbing layer 10 under heating, followed by performing photo- or thermal curing, to thereby form the cladding layer 4.

In order to facilitate the peeling from the cladding layer-forming resin film 41, preferably, no adhesion treatment is performed on the protective film 43 or the base film 42. If required, mold release treatment may be performed (see c and d in FIG. 5).

Alternatively, the cladding layer 4 may be formed through applying a cladding layer-forming resin varnish onto the UV-absorbing layer 10 through spin-coating or a similar technique, removing the solvent of the varnish, and curing the varnish by light or heat.

In a third step (see FIG. 3(c)), a core layer-forming resin film 51 is laminated on the cladding layer 4, to thereby form a core layer 5.

In the third step, when a base film 42 is present on the cladding layer 4, the base film is peeled off. Then, a core layer-forming resin film 51 is pressed under heating the cladding layer, whereby the core layer 5 having a refractive index higher than that of the cladding layer 4 is formed on the cladding layer. From the viewpoints of good adhesion and enhanced follow-up ability, lamination is preferably conducted under reduced pressure.

No particular limitation is imposed on the heating temperature and the pressure for lamination, but the heating temperature is preferably 50 to 130° C., and the lamination pressure is preferably about 0.1 to about 1.0 MPa (1 to 10 kgf/cm$^2$).

Figure 6:
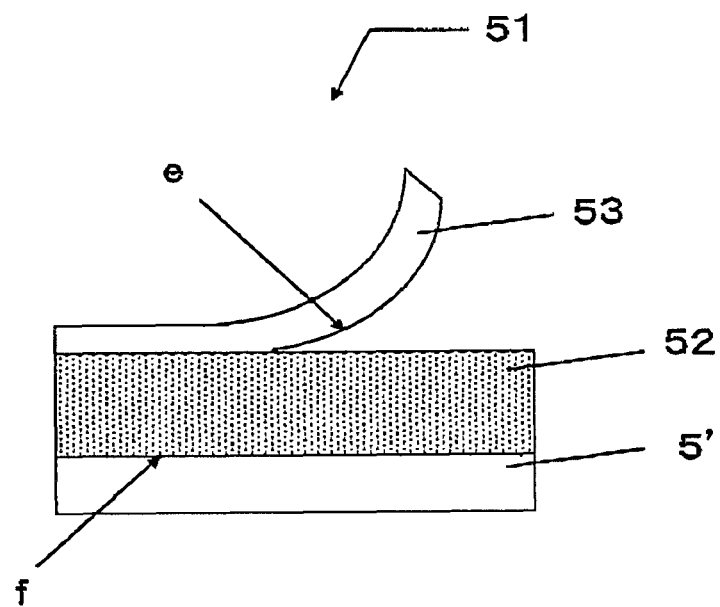
FIG. 6 A schematic view of a core layer-forming resin film.

As shown in FIG. 6, the core layer-forming resin film 51 is formed of the core layer 5 and the base film 52. In this case, handling of the laminated body is easy. However, alternatively, the core layer-forming resin film 51 may be formed the core layer 5 solely.

Alternatively, the core layer 5 may be formed through applying a core layer-forming resin varnish onto the cladding layer 4 through spin-coating or a similar technique, and removing the solvent of the varnish.

In the case where a protective film 53 is formed on the backside of the base film 52 in the core layer-forming resin film 51 (see FIG. 6), the protective film 53 is peeled off. Then, the core layer-forming resin film 51 is laminated. In this case, in order to facilitate the peeling from the core layer 5, preferably, no adhesion treatment is performed on the protective film 53 or the base film 52. If required, mold release treatment may be performed (see e and f in FIG. 6).

In a fourth step (see FIGS. 3(d) and 3(e)), the core layer 5 is subjected to light exposure and development, to thereby form an optical waveguide core pattern 6. Specifically, the core layer is imagewise irradiated with a UV ray 8 through a photomask pattern 7.

Examples of the UV light source include conventionally known light sources capable of effectively radiating ultraviolet light such as a carbon arc lamp, a mercury vapor arc lamp, an ultra-high pressure mercury lamp, a high-pressure mercury lamp, and a xenon lamp.

Next, in the case where the base film 52 remains attached onto the core layer 5, the base film 52 is peeled off therefrom, and then the core layer is subjected to wet development, etc., to remove non-exposed portions of the core layer, thereby forming the optical waveguide core pattern 6. In the wet development, the core layer is developed with an organic solvent-type or an alkaline developer suitable for the composition of the core layer-forming resin film or the core layer-forming resin varnish film through a known technique such as spraying, swinging immersion, brushing, or scrubbing.

Examples of the organic solvent-type developer include N-methylpyrrolidone, N,N-dimethylformamide, N,N-dimethylacetamide, cyclohexanone, methyl ethyl ketone, methyl isobutyl ketone, γ-butyrolactone, methyl cellosolve, ethyl cellosolve, propylene glycol monomethyl ether, and propylene glycol monomethyl ether acetate.

In order to suppress inflammability, each of these organic solvents may contain water in an amount generally 1 to 20 parts by mass with respect to 100 parts by mass of each organic solvent.

The alkaline developer used in the invention may be an aqueous alkaline solution, a water-based developer, etc. No particular limitation is imposed on the base of the aqueous alkaline solution, and examples of the base include hydroxides of alkali such as lithium, sodium or potassium; carbonates (carbonate salts or bicarbonate salts) of alkali such as lithium, sodium, potassium, or ammonium; alkali metal phosphate such as potassium phosphate and sodium phosphate; alkali metal pyrophosphate such as sodium pyrophosphate and potassium pyrophosphate; sodium salts such as borax and sodium metasilicate; and organic bases such as tetramethylammonium hydroxide, triethanolamine, ethylenediamine, diethylenetriamine, 2-amino-2-hydroxymethyl-1,3-propanediol, and 1,3-diaminopropanol-2-morpholine.

The aqueous alkaline solution serving as a developer preferably has a pH of 9 to 11, and the temperature of the solution is adjusted in accordance with the developability of the core-forming resin composition layer.

The aqueous alkaline solution may further contain a surfactant, a defoaming agent, a small amount of organic solvent for the enhancement of developability.

Among these alkaline developers, aqueous lithium carbonate solution, aqueous sodium carbonate solution, and aqueous potassium carbonate solution are particularly preferred, since these solutions impose less irritation to the human body and less load to the environment.

If required, the aforementioned aqueous alkaline solutions may be used in combination with an organic solvent. No particular limitation is imposed on this organic solvent, so long as this solvent can be admixed with the aqueous alkaline solutions. Examples of the organic solvent include alcohols such as methanol, ethanol, isopropanol, butanol, ethylene glycol, and propylene glycol; ketones such as acetone and 4-hydroxy-4-methyl-2-pentanone; and polyhydric alcohol alkyl ethers such as ethylene glycol monomethyl ether, ethylene glycol monoethyl ether, propylene glycol monomethyl ether, propylene glycol monoethyl ether, diethylene glycol monomethyl ether, diethylene glycol monoethyl ether, and diethylene glycol monobutyl ether.

These organic solvents may be used singly or in combination of two or more species.

After completion of development, if required, the core of the optical waveguide may be washed with a washing liquid containing water and the aforementioned organic solvent. The organic solvents may be used singly or in combination of two or more species. Generally, the organic solvent content is preferably 2 to 90 mass %, and the temperature of the washing liquid is adjusted in accordance with the developability of the core-forming resin composition layer.

Examples of the method of developing method include a dipping method, a paddle method, a spray method such as a high-pressure spray method, a brushing method, and a scrubbing method. Among these methods, a high-pressure spray method is most suitable in order to improve the resolution of core patterns.

If required, two or more methods may be employed in combination.

After completion of the development, the thus-formed core pattern may be subjected to an optional post-treatment such as heat treatment at about 60 to about 250° C. or exposure to light with an intensity of about 0.1 to about 1,000 mJ/cm$^2$ for further curing the optical waveguide core pattern.

Figure 7:
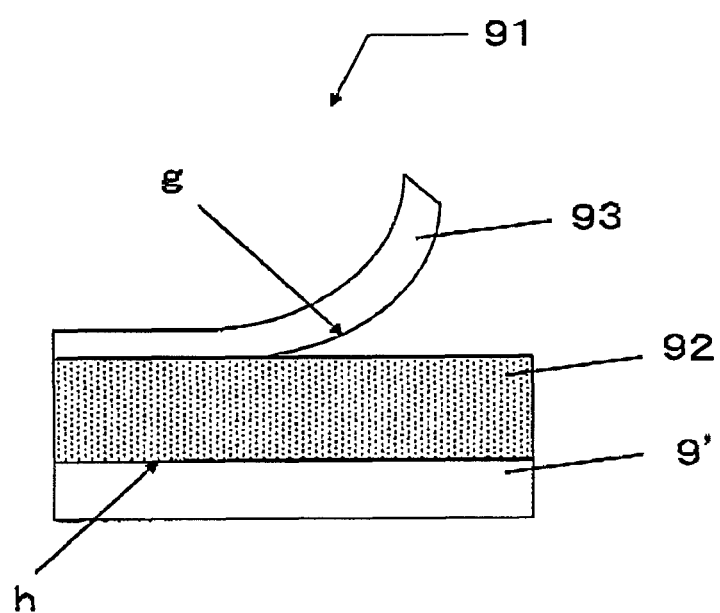
FIG. 7 A schematic view of an upper cladding layer-forming resin film.

Subsequently, in a fifth step (see FIG. 3(f)), a step of laminating an upper cladding layer-forming resin film 91 (see FIG. 7) for embedding the core pattern 6, and a step of curing a cladding layer-forming resin layer 9' of the upper cladding layer-forming resin film 91, to thereby form an upper cladding layer 9 are preformed.

When the cladding layer-forming resin layer 9' is formed on the base film 92, the cladding layer-forming resin 9' is positioned on a side of the core pattern 6.

As described above, the thickness of the upper cladding layer 9 is preferably greater than that of the core layer 5.

Curing is performed by light or heat in a manner similar to that described above.

In the case where a protective film 93 is formed on the backside of the base film 92 in the cladding layer-forming resin film 91 (see FIG. 7), the protective film 93 is peeled off. Then, the cladding layer-forming resin film 91 is pressed to the patterned core layer under heating, followed by performing photo- or thermal curing, to thereby form the cladding layer 8. In this case, the base film 92 may be peeled or remain attached, if required.

When the base film remains attached, the cladding layer-forming resin layer 9' is preferably formed on the base film 92 which has undergone adhesion treatment.

In order to facilitate the peeling from the cladding layer-forming resin film 91, preferably, no adhesion treatment is performed on the protective film 93. If required, mold release treatment may be performed (see g and f in FIG. 7).

Alternatively, the cladding layer 9 may be formed through applying a cladding layer-forming resin varnish through spin-coating or a similar technique, removing the solvent of the varnish, and curing the varnish by light or heat.

EXAMPLES

The present invention will next be described in detail by way of examples, which should not be construed as limiting the invention thereto. Unless otherwise specified, the unit "%" in the Examples means "mass %." As used herein, the term "(meth)acrylic acid" refers to "an acrylic acid" and "the corresponding methacrylic acid." Similarly, "(meth)acrylate" refers to "an acrylate" and "the corresponding methacrylate," and "(meth)acryloyl group" refers to "an acryloyl group" and "the corresponding methacryloyl group."
(Evaluation Methods)
1. UV Transmittance The transmittance of UV-absorbing film was measured by means of a spectrophotometer (U-3410, Hitachi Corporation).
2. Evaluation of Resolution After light exposure and development, the patterned core was visually observed under an optical microscope. The resolution was evaluated with the following ratings:
O; No development residue
Δ; Slight development residue, with no practical problem
X; Bridging between cores Example 1

(1) Preparation of Photosensitive Resin Composition

A copolymer of methacrylic acid/methyl methacrylaye/butyl acrylate (22/57/21, weight average molecular weight: 110,000, glass transition temperature (Tg): 66° C., acid value: 144), serving as (A) thermoplastic polymer having a carboxyl group, was dissolved in a methyl cellosolve/toluene mixture (ratio (by mass) 60/40), to thereby prepare a varnish (thermoplastic polymer content: 40 mass %) (component (A-1)).

Separately, an urethane compound containing an ethylenically unsaturated group (UF-8003 (tradename), KYOEISHA CHEMICAL Co., Ltd., 80 mass % methyl ethyl ketone solution, component (B-1)) and polyoxyethylene-modified bisphenol A methacrylate (component (B-2)), serving as (B) photopolymerizable compound, were provided.

Subsequently, as shown in Table 1, 175 parts by mass of the above component (A-1), 63 parts by mass of the above component (B-1) and 36 parts by mass of the above component (B-2), and also 2.5 parts by mass of 2-benzyl-2-(dimethylamino)-4-morpholinobutylphenone (Irgacure 369, Ciba Specialty Chemicals) serving as component (C), and other components shown in Table 1 were mixed, to thereby prepare a photosensitive resin composition varnish.

(2) Production of UV-Absorbing Film

The photosensitive resin composition varnish produced in (1) above was applied onto polyethylene terephthalate (PET) film 4 having a thickness of 25 μm, serving as a substrate (support) film, by means of a coater (Multicoater M-200, HIRANO TECSEED Co., Ltd.). The coating film was dried at 80° C. for 10 minutes and 100° C. for 10 minutes, to thereby yield a UV-absorbing film in which a photosensitive resin layer is laminated on the base film.

In this case, the thickness of the photosensitive resin layer of the UV-absorbing film can be adjusted as desired by tuning the gap of the coater. In Example 1, the thickness was adjusted so that the cured layer had a thickness of 25 μm. Table 1 shows the UV transmittance of the UV-absorbing film.

Subsequently, polyethylene film serving as a protective film is attached onto the photosensitive resin layer.

(3) Production of Core Layer-Forming Resin Film and Cladding Layer-Forming Resin Film According to the compositional proportions shown in Table 2, a core layer-forming resin composition and a cladding layer-forming resin composition were prepared. Each of these compositions was mixed with a solvent (methyl ethyl ketone, 40 parts by mass with respect to 100 parts by mass of each composition), to thereby prepare resin varnishes for producing a core layer and a cladding layer.

In Table 2, each of the amount of (i) base polymer and the amount of (ii) photopolymerizable compound is mass % relative to the total amount of components (i) and (ii), and the amount of (iii) photopolymerization initiator is a ratio (parts by mass) relative to 100 parts by mass in total amount of components (i) and (ii).

Each of an upper and lower cladding layer-forming resin films was produced by applying the above cladding-forming resin varnish onto polyethylene terephthalate (PET) film (COSMOSHINE A-4100 (tradename, available from Toyobo Co., Ltd., thickness: 50 μm, coating surface: non-treated)), serving as a substrate (support) film, by means of a coater (Multicoater M-200, HIRANO TECSEED Co., Ltd.), and drying the coating film at 80° C. for 10 minutes and 100° C. for 10 minutes.

In this case, the thickness of the cladding-forming resin film can be adjusted as desired by tuning the gap of the coater. In Example 1, the thickness was adjusted so that the cured lower cladding layer-forming resin film had a thickness of 30 μm and the cured upper cladding layer-forming resin film had a thickness of 80 μm.

A core layer-forming resin film was produced by applying the aforementioned core-forming resin varnish onto polyethylene terephthalate (PET) film (COSMOSHINE A-4100 (tradename, available from Toyobo Co., Ltd., thickness: 50 μm, coating surface: non-treated)), serving as a substrate (support) film, by means of a coater (Multicoater M-200, HIRANO TECSEED Co., Ltd.), and drying the coating film at 80° C. for 10 minutes and 100° C. for 10 minutes.

In this case, the thickness of the core-forming resin film can be adjusted as desired by tuning the gap of the coater. In Example 1, the thickness was adjusted so that the cured film had a thickness of 50 μm.

After completion of curing, the refractive indice of the optical waveguide-forming resin films (i.e., core layer-forming resin film and cladding layer-forming resin film) of Example 1 were measured by means of a prism coupler (Model 2020, Metricon) (measured at 830 nm). The core layer-forming resin film was found to have a refractive index of 1.583, and the cladding layer-forming resin film was found to have a refractive index of 1.550.

(4) Production of Optical Waveguide

A glass-fabric-based epoxy resin substrate (FR-4, Hitachi Chemical Company, Ltd., MCL-E-679-F, silica (serving as inorganic filler) content: 41 vol. %), which is a known printed wiring board part, was used. Copper foil of the resin substrate was etched, and the aforementioned UV-absorbing film was laminated on the etched surface by means of a vacuum pressure laminator ("MVLP-500" available from Meld Co., Ltd.) at 0.5 MPa and 60° C. for a pressing time of 30 seconds. The substrate (support) film was peeled off. Subsequently, the UV-absorbing film was irradiated with a UV ray (wavelength: 365 nm) at 2,000 mJ/cm$^2$ by means of an ultraviolet exposure apparatus ("MAP-1200" available from Dainippon Screen Manufacturing Co., Ltd.), to thereby photocure the film. Then, the photocured film was thermally cured in an oven at 160° C. for one hour, to thereby form a UV-absorbing layer 10 (see FIG. 3(a)).

Subsequently, the aforementioned cladding layer-forming resin film (lower cladding layer-forming resin film) was laminated on the UV-absorbing layer 10. The laminated product was irradiated with a UV ray (wavelength: 365 nm) at 1,000 mJ/cm$^2$ by means of an ultraviolet exposure apparatus ("MAP-1200" available from Dainippon Screen Manufacturing Co., Ltd.), to thereby cure the laminated lower cladding layer-forming resin film, whereby a lower cladding layer 4 was formed (see FIG. 3(b)).

Next, the PET film, which is a base film on the lower cladding layer 4, was peeled off, and the aforementioned core layer-forming resin film was laminated on the cladding layer 4 in a similar manner (see FIG. 3(c)).

By use of a negative photomask 7 having a line width/line space as shown in Table 3, the aforementioned core layer-forming resin film was irradiated with a UV ray (wavelength: 365 nm) at 500 mJ/cm$^2$ by means of the aforementioned ultraviolet exposure apparatus (see FIG. 3(d)). Then, the PET film 52, which is the substrate (support) film, was peeled off, and the core pattern 6 was developed with a developer (ethyl cellosolve/N,N-dimethylacetamide=8/2 (by mass) mixture) (see FIG. 3(e)).

Then, in a manner similar to formation of the lower cladding layer 4, the aforementioned cladding-forming resin film was laminated, and the resin film was subjected to UV irradiation and heating at 160° C. for 60 minutes, to thereby form an upper cladding layer 9 (see FIG. 3(f)), whereby optical waveguides each having a pattern with a line width/line space shown in Table 3 were produced.

These optical waveguides were evaluated through the aforementioned method. Table 3 shows the results.

Example 2

The procedure of Example 1 was repeated, except that the composition and amount of the resin composition for producing UV-absorbing film were changed as shown in Table 1, and the thickness of the UV-absorbing layer was changed to 38 μm, to thereby produce a UV-absorbing film, whereby optical waveguides were produced. Table 3 shows the evaluation results.

Example 3

The procedure of Example 1 was repeated, except that the composition and amount of the resin composition for producing UV-absorbing film were changed as shown in Table 1, to thereby produce a UV-absorbing film, whereby optical waveguides were produced. Table 3 shows the evaluation results.

Example 4

The procedure of Example 1 was repeated, except that a photosensitive resin composition containing 100 parts by mass of a mixture of 1,3-bis(3-aminophenoxy)benzene/N,N-dimethylacetamide/3,3',4,4'-benzophenonetetracarboxylic dianhydride (360.5/1200/439.5 by mass ratio), 10 parts by mass of a phenoxy resin ("YP50," Tohto Kasei Co., Ltd., average molecular weight: 70,000), 4 parts by mass of alkylphenol ("H4010," Hitachi Chemical Company, Ltd.), and 114 parts by mass of N-methyl-2-pyrrolidone serving as a solvent was used, to thereby produce optical waveguides. Table 3 shows the results of evaluation performed in a manner similar to that employed in Example 1. The UV-absorbing film employed in Example 4 had a UV transmittance (at 365 nm) of 0%.

Comparative Example 1

The procedure of Example 1 was repeated, except that no UV-absorbing layer was formed, to thereby produce optical waveguides. Table 3 shows the results of evaluation performed in a manner similar to that employed in Example 1.

Referential Example 1

The procedure of Comparative Example 1 was repeated, except that a glass-fabric-based epoxy resin substrate (FR-4, Hitachi Chemical Company, Ltd., MCL-E-67 (containing no inorganic filler) was employed as a substrate, to thereby produce optical waveguides. Table 3 shows the results of evaluation performed in a manner similar to that employed in Example 1.

TABLE 1

|  |  | Ex. 1 | Ex. 2 | Ex. 3 |
|---|---|---|---|---|
| Component (A) | A-1*[1] | 175 | — | — |
|  | A-2*[2] | — | 175 | — |
|  | A-3*[3] | — | — | 175 |
| Component (B) | B-1*[4] | 63 | 63 | 41 |
|  | B-2*[5] | 36 | — | 48 |
|  | B-3*[6] | — | 36 | — |
| Component (C) | Irgacure 369*[7] | 2.5 | 2.5 | 2.5 |
| Other components | Senstizier*[8] | 0.08 | 0.08 | 0.08 |
|  | Thermal curing agent*[9] | 30 | 30 | 40 |
|  | Polymerization inhibitor*[10] | 0.5 | — | — |
|  | Pigment*[11] | 0.5 | — | — |
|  | Dye*[12] | 0.04 | 0.04 | 0.04 |
|  | Leveling agent*[13] | 0.1 | 0.1 | 0.1 |
|  | Solvent*[14] | 36 | 30 | 25 |
| UV transmittance (%) (at 365 nm) |  | 0.3 | 47 | 27 |

*[1] Varnish of methacrylic acid/methyl methacrylate/butyl acrylate copolymer (22/57/21, weight average molecular weight: 110,000, glass transition temperature (Tg): 66° C., acid value: 144) dissolved in methyl cellosolve/toluene solvent mixture (60/40 (by mass)) (thermoplastic polymer content: 40 mass %)
*[2] Varnish of methacrylic acid/methyl methacrylate/butyl acrylate copolymer (12, 58, 30, weight average molecular weight: 60,000, glass transition temperature (Tg): 61° C., acid value: 78) dissolved in methyl cellosolve/toluene solvent mixture (60/40 (by mass)) (thermoplastic polymer content: 40 mass %)
*[3] Varnish of methacrylic acid/methyl methacrylate/butyl acrylate copolymer (26, 34, 20, 20, weight average molecular weight: 65,000, glass transition temperature (Tg): 84° C., acid value: 170) dissolved in methyl cellosolve/toluene solvent mixture (60/40 (by mass)) (thermoplastic polymer content: 40 mass %)
*[4] UF-8003 (tradename, KYOEISHA CHEMICAL Co., Ltd., 80-mass % methyl ethyl ketone solution, number average molecular weight 6,400), which is produced through reaction of an urethane compound having end isocyanate groups with 2 mol of 2-hydroxyethyl acrylate, wherein the urethane compound having end isocyanate groups is produced through addition polymerization of 3 mol of a polycarbonate compound containing hexamethylene carbonate/pentamethylene carbonate (5/5 (by mole)) as a repeating unit, having a number average molecular weight of 790 and having end hydroxyl groups to 4 mol of isophorone diisocyanate.
*[5] Polyoxyethylene-modified bisphenol A methacrylate
*[6] Tris(methylacryloyloxyethylene glycol isocyanatohexamethylene) isocyamurate
*[7] Irgacure 369 (Cibe Specialty Chemicals): 2-benzyl-2-(dimethylamino)-4-morpholinobutylphenone
*[8] N,N'-Tetraethyl-4,4'-diaminobenzophenone
*[9] 75-mass % Solution (in methyl ethyl ketone) of a block isocyanate compound produced through reaction between an isocyanate compound represented by formula (I) and a methyl ethyl ketone oxime (blocking agent) represented by formula (II)

TABLE 1-continued

|  | Ex. 1 | Ex. 2 | Ex. 3 |
|---|---|---|---|

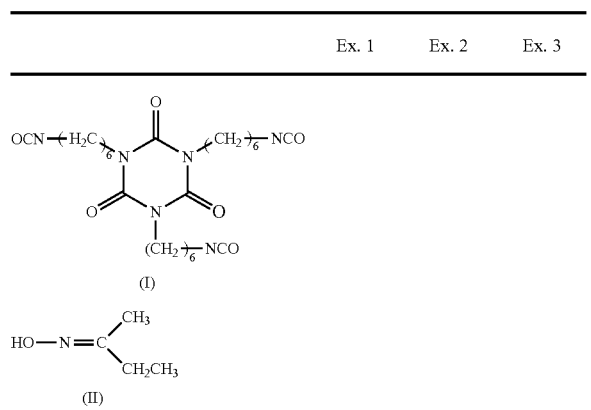

(I)

(II)

[10] 2,2'-Methylenebis(4-ethyl-6-t-butylphenol)
[11] Pigment Yellow (Dainichiseika Color & Chemicals Mfg. Co., Ltd.)
[12] Monoazo dye (Hodogaya Chemical Co., Ltd.)
[13] Silicone (Toray Dow Corning Co., Ltd.)
[14] Solvent mixture of methyl ethyl ketone, acetone, and N,N-dimethylformamide (20/3/6 by mass ratio)

TABLE 2

| | Resin composition | | |
|---|---|---|---|
| | (i) Base polymer | (ii) Photo-polymerizable compound | (iii) Photo-polymerization initiator |
| Core | PHENOTOHTO YP-70[15] (20 mass %) | A-BPEF[16] (39.8 mass %) EA-1020[17] (39.8 mass %) | Irgacure 819[19] (1 part by mass) Irgacure 2959[20] (1 part by mass) |
| Cladding | PHENOTOHTO YP-70[15] (35.7 mass %) | KRM-2110[18] (64.3 mass %) | SP-170[21] (2 parts by mass) |

[15] PHENOTOHTO YP-70; bisphenol A/bisphenol F copolymer-typed phenoxy resin (Tohto Kasei Co., Ltd.)
[16] A-BPEF; 9,9-bis[4-(2-acryloyloxyethoxy)phenyl]fluorene bisphenol A-typed epoxyacrylate (Shin-Nakamura Chemical Co., Ltd.)
[17] EA-1020; bisphenol A-typed epoxyacrylate (Shin-Nakamura Chemical Co., Ltd.
[18] KRM-2110; alicyclic diepoxycarboxylate (ADEKA Corporation)
[19] Irgacure 819; bis(2,4,6-trimethylbenzoyl)phenylphosphine oxide (Ciba Specialty Chemicals)
[20] Irgacure 2959; 1-[4-(2-hydroxyethoxy)phenyl]-2-hydroxy-2-methyl-1-propan-1-one (Ciba Specialty Chemicals)
[21] SP-170; triphenylsulfonium hexafluoroantimonate (ADEKA Corporation)

TABLE 3

| | | Examples | | | | Comp. Ex. | Ref. Ex. |
|---|---|---|---|---|---|---|---|
| | | 1 | 2 | 3 | 4 | 1 | 1 |
| line width/line space | 50/50 | ○ | ○ | ○ | ○ | X | ○ |
| | 40/40 | ○ | ○ | △ | ○ | — | ○ |
| | 35/35 | ○ | △ | — | ○ | — | ○ |
| | 30/30 | ○ | — | — | ○ | — | ○ |
| | 25/25 | △ | — | — | △ | — | △ |
| | 50/200 | ○ | ○ | ○ | ○ | ○ | ○ |

INDUSTRIAL APPLICABILITY

By virtue of a high-resolution core pattern, the optical waveguide of the present invention can provide high-density optical wiring. According to the production method of the present invention, an optical waveguide having a high-resolution core pattern can be produced at high productivity.

The invention claimed is:

1. An optical waveguide comprising:
a resin substrate containing an inorganic filler; and
at least a UV-absorbing layer, a lower cladding layer, a patterned core layer, and an upper cladding layer laminated above the resin substrate in this order,
wherein
the lower cladding layer, the patterned core layer, and the upper cladding layer are formed from a resin composition which comprises (i) a base polymer, (ii) a photopolymerizable compound, and (iii) a photopolymerization initiator,
the core layer has been patterned through light exposure and development,
the UV-absorbing layer has a thickness of 20 to 50 μm, and
a content of the inorganic filler is 15 to 65 vol. %.

2. The optical waveguide according to claim 1, wherein the UV-absorbing layer is formed from a photosensitive resin composition, which comprises:
(A) a thermoplastic polymer having a carboxyl group,
(B) a photopolymerizable compound having a polymerizable ethylenically unsaturated group in the molecule thereof, and
(C) a photopolymerization initiator.

3. The optical waveguide according to claim 2, wherein the (B) photopolymerizable compound includes a urethane compound having an ethylenically unsaturated group.

4. The optical waveguide according to claim 3, wherein the urethane compound having an ethylenically unsaturated group is produced through reaction between a urethane compound having an isocyanate group at each end and a hydroxyl-group-having ethylenically unsaturated compound, and
the urethane compound having an isocyanate group at each end is produced through reaction between a polycarbonate compound having a hydroxyl group at each end and a diisocyanate compound.

5. The optical waveguide according to claim 1, wherein the UV-absorbing layer has a UV transmittance of 50% or less at a wavelength of the light exposure.

6. The optical waveguide according to claim 1, wherein the inorganic filler is silica.

7. A method for producing an optical waveguide, comprising:
a step of forming a UV-absorbing layer on a resin substrate containing an inorganic filler;
a step of forming a lower cladding layer on the UV-absorbing layer;
a step of forming a core layer on the lower cladding layer;
a step of subjecting the core layer to light exposure to thereby transfer a pattern having a given shape to the core layer;
a step of developing the core layer to thereby form a core pattern; and
a step of forming an upper cladding layer on the patterned core layer, wherein
a lower cladding layer-forming film, a core layer-forming film, and an upper cladding layer-forming film are employed respectively in the steps of forming a lower cladding layer, a core layer, and an upper cladding layer,
the UV-absorbing layer has a thickness of 20 to 50 μm,
a content of the inorganic filler is 15 to 65 vol. %, and
the lower cladding layer-forming film, the core layer-forming film, and the upper cladding layer-forming film are formed from a resin composition which comprises (i) a base polymer, (ii) a photopolymerizable compound, and (iii) a photopolymerization initiator.

8. The method for producing an optical waveguide according to claim 7, wherein
the step of forming a UV-absorbing layer comprises laminating a UV-absorbing film on the substrate and pressing the film to the substrate under heating.

9. The optical waveguide according to claim 1, wherein the resin composition is the same for each of the lower cladding layer, the patterned core layer, and the upper cladding layer.

10. The optical waveguide according to claim 1, wherein the resin composition from which the lower cladding layer and the upper cladding layer are formed is different from the resin composition from which the patterned core layer is formed.

11. The method for producing an optical waveguide according to claim 7, wherein the resin composition is the same for each of the lower cladding layer-forming film, the core layer-forming film, and the upper cladding layer-forming film.

12. The method for producing an optical waveguide according to claim 7, wherein the resin composition from which the lower cladding layer-forming film and the upper cladding layer-forming film are formed is different from resin composition from which the core layer-forming film is formed.

* * * * *